United States Patent
Pajonk et al.

(10) Patent No.: US 6,258,436 B1
(45) Date of Patent: Jul. 10, 2001

(54) CATALYST BODY

(75) Inventors: Günther Pajonk, Zapfendorf; Andreas Girschik, Tüschnitz; Robert Kleuderlein, Altenkunstadt, all of (DE); Frank Witzel, Bloomfield Hills, MI (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/577,051

(22) Filed: May 22, 2000

Related U.S. Application Data

(63) Continuation of application No. PCT/DE98/03408, filed on Nov. 18, 1998.

(30) Foreign Application Priority Data

Nov. 21, 1997 (DE) ............................................. 197 51 788

(51) Int. Cl.⁷ ....................................................... B01J 35/04
(52) U.S. Cl. ......................... 428/116; 428/131; 428/117; 428/118; 422/180
(58) Field of Search ................................... 428/131, 116, 428/117, 118; 422/180

(56) References Cited

U.S. PATENT DOCUMENTS

| | | | |
|---|---|---|---|
| 4,127,691 | * 11/1978 | Frost | 428/116 |
| 4,135,018 | * 1/1979 | Bonin et al. | 428/116 |
| 4,381,815 | * 5/1983 | Frost et al. | 165/10 |
| 4,448,828 | 5/1984 | Mochida et al. | 428/36 |
| 5,449,541 | * 9/1995 | Lipp et al. | 428/116 |
| 5,516,571 | 5/1996 | Kawamoto | 428/116 |

FOREIGN PATENT DOCUMENTS

| | | |
|---|---|---|
| 2709003 | 9/1977 | (DE) . |
| 2819378C2 | 11/1988 | (DE) . |
| 3713209A1 | 11/1988 | (DE) . |

OTHER PUBLICATIONS

"Haus der Technik" (House of Technology), Prof. E. Steinmetz (Ed.), Vulkan–Verlag Essen, 1992, p. 23.

\* cited by examiner

*Primary Examiner*—William P. Watkins, III
(74) *Attorney, Agent, or Firm*—Herbert L. Lerner; Laurence A. Greenberg; Werner H. Stemer

(57) ABSTRACT

A catalyst body, which contains a number of passages through which a medium can flow in a preferred direction, is to be able to operate reliably with little cleaning outlay. It is also intended for cracking during the process of manufacturing the catalyst body to be particularly rare. For this purpose, each passage, disposed at right angles to the preferred direction, is approximately rectangular in cross section, as defined by a longitudinal side and a shorter transverse side. The number of passages per unit surface area lies in the range from 0.5 to 2.5 cm$^{-2}$, and the longitudinal sides of a first group of the passages are disposed approximately at right angles to the longitudinal sides of a second group of the passages. The passages are in this case combined to form subgroups, the passages of each subgroup, in terms of their cross sections, forming an approximately square configuration, and each subgroup containing in each case passages from the same group.

7 Claims, 1 Drawing Sheet

CATALYST BODY

CROSS-REFERENCE TO RELATED APPLICATION

This is a continuation of copending International Application PCT/DE98/03408, filed Nov. 18, 1998, which designated the United States.

BACKGROUND OF THE INVENTION

Field of the Invention

The invention relates to a catalyst body that has a number of passages through which a medium can flow in a preferred direction.

Catalysts are used, for example, to remove nitrogen oxides, hydrocarbons, carbon monoxide and/or dioxins from the flue gas of an incineration plant. Catalysts of this nature may be configured as honeycomb catalysts. In a honeycomb catalyst, it is usual to provide a catalyst body that is in honeycomb form and has a number of passages through which a liquid and/or a gas, such as for example the flue gas, can flow in a preferred direction.

A honeycomb catalyst of this nature may be provided for reducing or oxidizing pollutants. The honeycomb catalyst which is provided as a $DeNO_x$ catalyst, for example, uses the so-called selective catalytic reduction (SCR) process, with an addition of a reducing agent, to reduce nitrogen oxides ($NO_x$) to nitrogen ($N_2$) and water ($H_2O$). However, the honeycomb catalyst that is configured as a dioxin catalyst also has a certain SCR activity. For example, a dioxin catalyst oxidizes polychlorinated dibenzodioxins/dibenzofurans using molecular oxygen.

To catalytically clean the flue gas from stationary or mobile incineration plants or internal combustion engines, honeycomb catalysts are used, the catalyst bodies of which have a square passage geometry. German Patent DE 28 19 378 C2 discloses a honeycomb body with cells which are guided through and are of substantially rectangular basic shape. In this case, the longitudinal sides of a first group of the passages are disposed approximately at right angles to the longitudinal sides of a second group of the passages.

The number of channels may in this case be $10/6.452$ $cm^2$. Published, Non-Prosecuted German Patent Application DE 37 13 209 A1 also discloses a honeycomb body with passages of approximately rectangular cross section. A ceramic structure body with a honeycomb body whose passages are approximately rectangular in cross section is also known in principle from the reference titled "Haus der Technik (House of Technology", Prof. E. Steinmetz (Ed.), Vulkan-Verlag Essen, (1992), p. 23.

However, with catalyst bodies of this nature there is a risk of mechanical blockage of the honeycomb openings caused by flue dust. Therefore, regular, comparatively expensive cleaning of the catalyst is required in order to ensure that the catalyst operates reliably. In addition, the production of catalyst bodies of this nature involves the problem of cracking during the manufacturing process owing to the internal stress of the catalyst bodies.

SUMMARY OF THE INVENTION

It is accordingly an object of the invention to provide a catalyst body which overcomes the above-mentioned disadvantages of the prior art devices of this general type, which can be operated particularly reliably with only little cleaning outlay. It is also intended for cracking during the process of manufacturing the catalyst body to be rare.

With the foregoing and other objects in view there is provided, in accordance with the invention, a catalyst body configuration, containing a catalyst body having a number of passages formed therein through which a medium can flow in a preferred direction. The catalyst body has a plurality of longitudinal sides and a plurality of shorter transverse sides defining the passages. Each of the passages is disposed at right angles to the preferred direction and is approximately rectangular in cross section, as defined by the longitudinal sides and the shorter transverse sides. A number of the passages per unit surface area lie in a range from 0.5 to 2.5 $cm^{-2}$. The longitudinal sides of a first group of the passages are disposed approximately at right angles to the longitudinal sides of a second group of the passages. The passages are combined to form subgroups and the passages of each of the subgroups, in terms of their cross sections, form an approximately square configuration. Each of the subgroups containing in each case the passages from a same group of one of the first group and the second group.

The object is achieved by the catalyst body of the type described above in which each passage, disposed at right angles to the preferred direction, is approximately rectangular in cross section, as defined by a longitudinal side and a shorter transverse side. The number of passages lying in the range from 0.5 to 2.5 $cm^{-2}$, and the longitudinal sides of the first group of the passages is disposed approximately at right angles to the longitudinal sides of a second group of the passages. According to the invention, the passages are combined to form subgroups, the passages of each subgroup, in terms of their cross sections, form an approximately square configuration, and each subgroup contains in each case passages from the same group.

The invention is based on the recognition that a catalyst body functions particularly reliably, even with little cleaning outlay, if the risk of mechanical blockage of the passages is kept at a low level. A catalyst body that is configured with a particularly low risk of the passages becoming blocked should also have a high catalytic activity. It has been found that in a particularly suitable catalyst body the number of passages per unit surface area lies in the range from 0.5 to 2.5 $cm^{-2}$, but preferably in the range from 0.9 to 1.6 $cm^{-2}$, with passages which are approximately rectangular in cross section.

The so-called AP value represents a measure of the catalytic activity of the catalyst body. This value is defined as the ratio of the geometric surface area of the catalyst body to its physical volume. At an identical AP value, a catalyst body whose passages have an approximately rectangular cross section of flow has fewer passages per unit surface area and therefore fewer passage edges than a catalyst body whose passage cross sections are approximately square. The smaller the number of passage edges, the lower the tendency of the passages to become mechanically blocked, since flue dust preferentially accumulates in the area of the passage edges. To keep the problems of internal stress when producing the honeycomb catalyst body, and the associated cracking during the manufacturing process, at a particularly low level, the longitudinal sides of the first group of the passages are advantageously disposed approximately at right angles to the longitudinal sides of the second group of the passages. Furthermore, the passages are combined to form subgroups, each subgroup containing passages from the same group. In terms of their cross sections, the passages of one subgroup form an approximately square configuration. Forming subgroups in this way allows the passages to be disposed particularly simply and flexibly in the catalyst body. Depending on what is most expedient, adjacent subgroups may be assigned to the first or second group of the passages. In both cases, a particularly stable overall structure is produced. With regard to each outer side, a catalyst body of this nature is able to withstand forces that act in the longitudinal and/or transverse directions.

In an advantageous configuration of the invention, subgroups are combined to form layers. Layers in which subgroups of the first and second groups of the passages are disposed alternately have proven particularly advantageous, since each such layer inherently exhibits a particularly low tendency to crack during the production process.

In an alternative, advantageous configuration, all the passages in one layer belong to the same group of passages.

An advantageous configuration of the passages in the catalyst body of this nature is provided by disposing the layers assigned to the first group of passages and the layers assigned to the second group of passages alternately.

The catalyst body may be configured as a supported catalyst, in which a support body is coated with a catalytically active layer. Advantageously, however, the catalyst body is configured as an unsupported extrudate. In this case, the catalyst body consists exclusively of catalyst material. An unsupported extrudate can be produced with the aid of an extrusion machine that produces shaped bodies from a soft, plastic mass.

That surface of each passage which is freely accessible to the gas and/or the liquid may preferably contain the materials titanium dioxide ($TiO_2$) in a proportion of 70 to 95% by weight, tungsten trioxide ($WO_3$) and/or molybdenum trioxide ($MoO_3$) in a proportion of 5 to 20% by weight, and vanadium pentoxide ($V_2O_5$) in a proportion of less than 5% by weight. A catalyst body of this nature is advantageously provided as a $DeNO_x$ catalyst.

The advantages achieved by the invention consist in particular in the fact that the present catalyst body, the passages of which, at right angles to the preferred direction, are approximately rectangular in cross section, at an identical AP value, is at less risk of the passages becoming mechanically blocked than the catalyst body in which the passages are approximately square in cross section. A catalyst body in which the number of passages lies in the range from 0.5 to 2.5 $cm^{-2}$ has a particularly high AP value and a particularly low risk of the passages becoming mechanically blocked. The catalyst body is therefore also particularly suitable for use in coal-fired power plants. The flue gas may in this case contain from 6 to 20 g of flue dust per standard cubic meter in the case of high-grade coal and from 6 to 50 g of flue dust per standard cubic meter in the case of low-grade coal. The formation of subgroups of passages ensures that the periphery of the catalyst body can be adapted particularly easily to different geometrical configurations, and the manufacturing costs for a catalyst body of this nature are kept particularly low.

Other features which are considered as characteristic for the invention are set forth in the appended claims.

Although the invention is illustrated and described herein as embodied in a catalyst body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
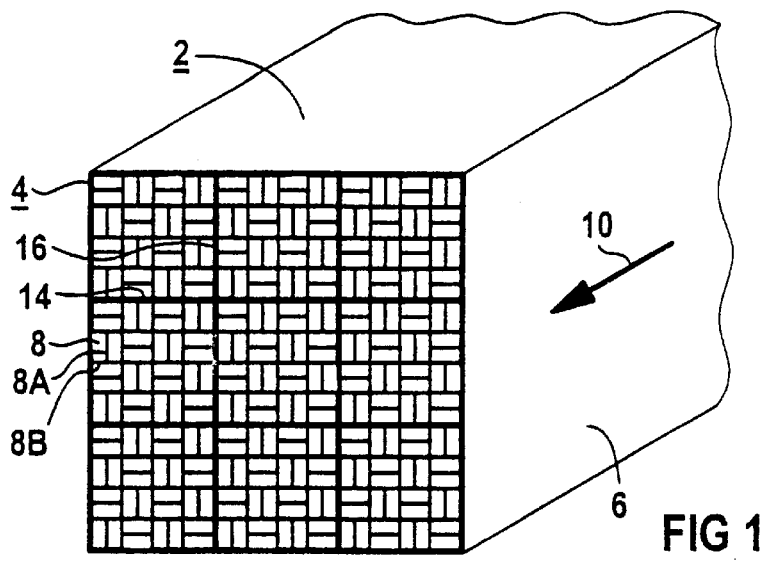
FIG. 1 is a diagrammatic, fragmented, perspective view of a $DeNO_x$ catalyst modular unit containing nine catalyst bodies according to the invention.

In all the figures of the drawing, sub-features and integral parts that correspond to one another bear the same reference symbol in each case. Referring now to the figures of the drawing in detail and first, particularly, to FIG. 1 thereof, there is shown a $DeNO_x$ catalyst modular unit 2 which includes a number of catalyst bodies 4 which are each of the same type and are disposed in a housing 6. The $DeNO_x$ catalyst modular unit 2 may also contain more or fewer of the catalyst bodies 4 than the number shown in FIG. 1. Each of the catalyst bodies 4 contains a number of passages 8 through which a flue gas from an incineration plant can flow in a preferred direction 10 and which, at right angles to the preferred direction 10, are approximately rectangular in cross section. Each of the passages 8 is delimited by a longitudinal side 8A and a shorter transverse side 8B.

Outer walls 14 and 16 of the particular catalyst body 4 are in each case 150 mm long. The passages 8 are dimensioned in such a way that the number of passages per unit surface area is in the range from 0.5 to 2.5 $cm^{-2}$. Consequently, the number of passages 8 lies in the range from 112 to 562 per catalyst body 4. The passages 8 are not illustrated in full in the diagrammatic representation shown in FIG. 1, but rather are merely indicated.

The catalyst bodies 4 are each configured as an unsupported extrudate and contain the materials titanium dioxide ($TiO_2$) in a proportion of 70 to 95% by weight, tungsten trioxide ($WO_3$) and/or molybdenum trioxide ($MoO_3$) in a proportion of 5 to 20% by weight, and vanadium pentoxide ($V_2O_5$) in a proportion of less than 5% by weight. Alternatively, the catalyst body 4 may also contain a support that is provided with a coating of the above-mentioned materials.

Figure 2:
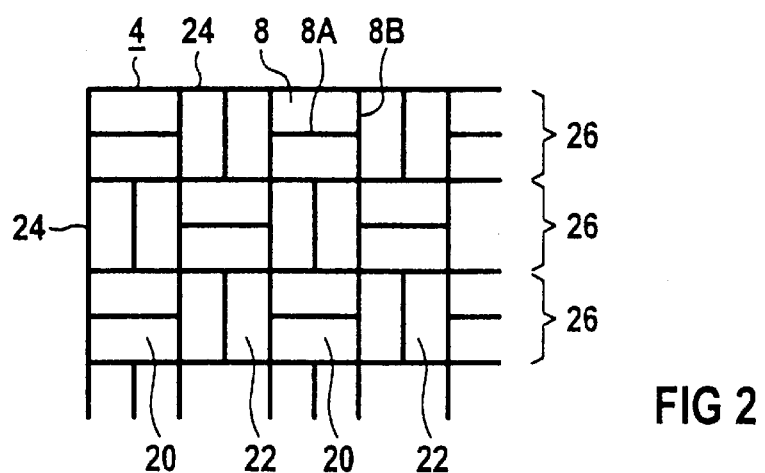
FIG. 2 is a cross sectional view through part of a first configuration of a catalyst body in accordance with FIG. 1.
Figure 3:
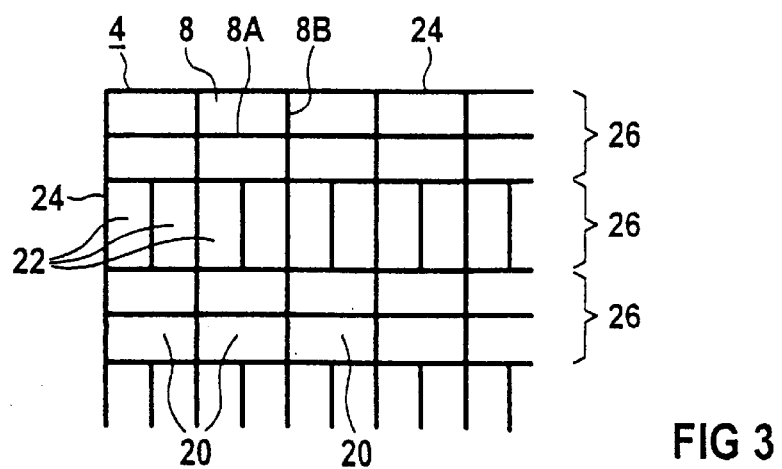
FIG. 3 is a cross sectional view through part of a second configuration of the catalyst body in accordance with FIG. 1.

FIGS. 2 and 3 show a cross section through part of the catalyst body 4 as shown in FIG. 1, in a first and a second configuration. In both configurations, the passages 8 are divided into a first group 20 and a second group 22. With regard to their longitudinal sides 8A, the passages 8 of the first group 20 are disposed at a right angle to the passages 8 of the second group 22. The groups 20, 22 of the passages 8 each contain subgroups 24. A subgroup 24 is in this case formed from two adjacent passages 8 belonging to the same group 20, 22. The passages 8 of a subgroup 24, in terms of their cross sections, form an approximately square configuration. A number of the subgroups 24 in turn forms a layer 26.

In the exemplary embodiment shown in FIG. 2, the subgroups 24 of the first group 20 of the passages 8 and of the second group 22 of the passages 8 are disposed alternately in each layer 26. The longitudinal sides 8A of each of the passages 8 are 11.36 mm long, and the transverse sides 8B are in each case 5.16 mm long. A number of the passages 8 per unit surface area of each catalyst body 4 is 1.28 $cm^{-2}$.

Consequently, each of the catalyst bodies 4 contains 288 passages and, with a free cross section of flow of 75, has an AP value of 423 m$^2$/m$^3$.

In the exemplary embodiment shown in FIG. 3, the layer 26 is in each case composed exclusively of the passages 8 from one of the groups 20 or 22. The layers 26 are disposed alternately, in such a manner that adjacent layers 26 do not belong to the same group 20, 22 of the passages 8. The longitudinal sides 8A of each passage 8 of the catalyst body 4 shown in FIG. 3 are 11.59 mm long, and their respective transverse sides 8B are 5.39 mm long. Each catalyst body 4 contains 288 passages. Consequently, the number of passages 8 per unit surface area is 1.28 cm$^{-2}$. With a free cross section of flow of 80%, each catalyst body 4 has an AP value of 435 m$^2$/m$^3$.

Both exemplary embodiments of the catalyst body 4 shown in FIGS. 2 and 3 have a particularly high AP value and a particularly low risk of the passages 8 becoming mechanically blocked. Consequently, the catalyst bodies 4 of this nature are particularly well suited to being used for removing pollutants from the flue gas from an incineration plant. The catalyst bodies 4 exhibit particularly high reliability with only little outlay on cleaning. Moreover, the formation of the subgroups of the passages 8 allows the periphery of the particular catalyst body 4 to be adapted particularly easily to different geometric configurations and keeps the manufacturing cost of the individual catalyst bodies 4 particularly low.

We claim:

1. A catalyst body configuration, comprising:

a catalyst body having a number of passages formed therein through which a medium can flow in a preferred direction, said catalyst body having a plurality of longitudinal sides and a plurality of shorter transverse sides defining said passages, each of said passages disposed at right angles to the preferred direction and being approximately rectangular in cross section, as defined by said longitudinal sides and said shorter transverse sides, said number of said passages per unit surface area lying in a range from 0.5 to 2.5 cm$^{-2}$, and said longitudinal sides of a first group of said passages disposed approximately at right angles to said longitudinal sides of a second group of said passages, said passages combined to form subgroups and said passages of each of said subgroups, in terms of their cross sections, form an approximately square configuration, and each of said subgroups containing in each case said passages from a same group of one of said first group and said second group.

2. The catalyst body configuration according to claim 1, wherein said number of said passages per unit surface area lies in a range from 0.9 to 1.6 cm$^{-2}$.

3. The catalyst body configuration according to claim 1, wherein said subgroups form layers, and said subgroups of said first group and said second group being disposed alternately in each layer of said layers.

4. The catalyst body configuration according to claim 1, wherein said subgroups form layers, and all of said passages in one of said layers belonging to the same group of said passages.

5. The catalyst body configuration according to claim 4, wherein said layers of said first group and said layers of said second group of said passages are disposed alternately.

6. The catalyst body configuration according to claim 1, wherein said catalyst body is an unsupported extrudate formed of titanium dioxide (TiO$_2$) in a proportion of 70 to 95% by weight, at least one of tungsten trioxide (WO$_3$) and molybdenum trioxide (MoO$_3$) in a proportion of 5 to 20% by weight, and vanadium pentoxide (V$_2$O$_5$) in a proportion of less than 5% by weight.

7. A DeNO$_x$ catalyst modular unit, comprising:

a plurality of catalyst bodies having a number of passages formed therein through which a medium can flow in a preferred direction, said catalyst bodies each having a plurality of longitudinal sides and a plurality of shorter transverse sides defining said passages, each of said passages disposed at right angles to the preferred direction and being approximately rectangular in cross section, as defined by said longitudinal sides and said shorter transverse sides, said number of said passages per unit surface area lying in a range from 0.5 to 2.5 cm$^{-2}$, and said longitudinal sides of a first group of said passages disposed approximately at right angles to said longitudinal sides of a second group of said passages, said passages combined to form subgroups and said passages of each of said subgroups, in terms of their cross sections, form an approximately square configuration, and each of said subgroups containing in each case said passages from a same group of one of said first group and said second group.

* * * * *